United States Patent Office 3,357,396
Patented Dec. 12, 1967

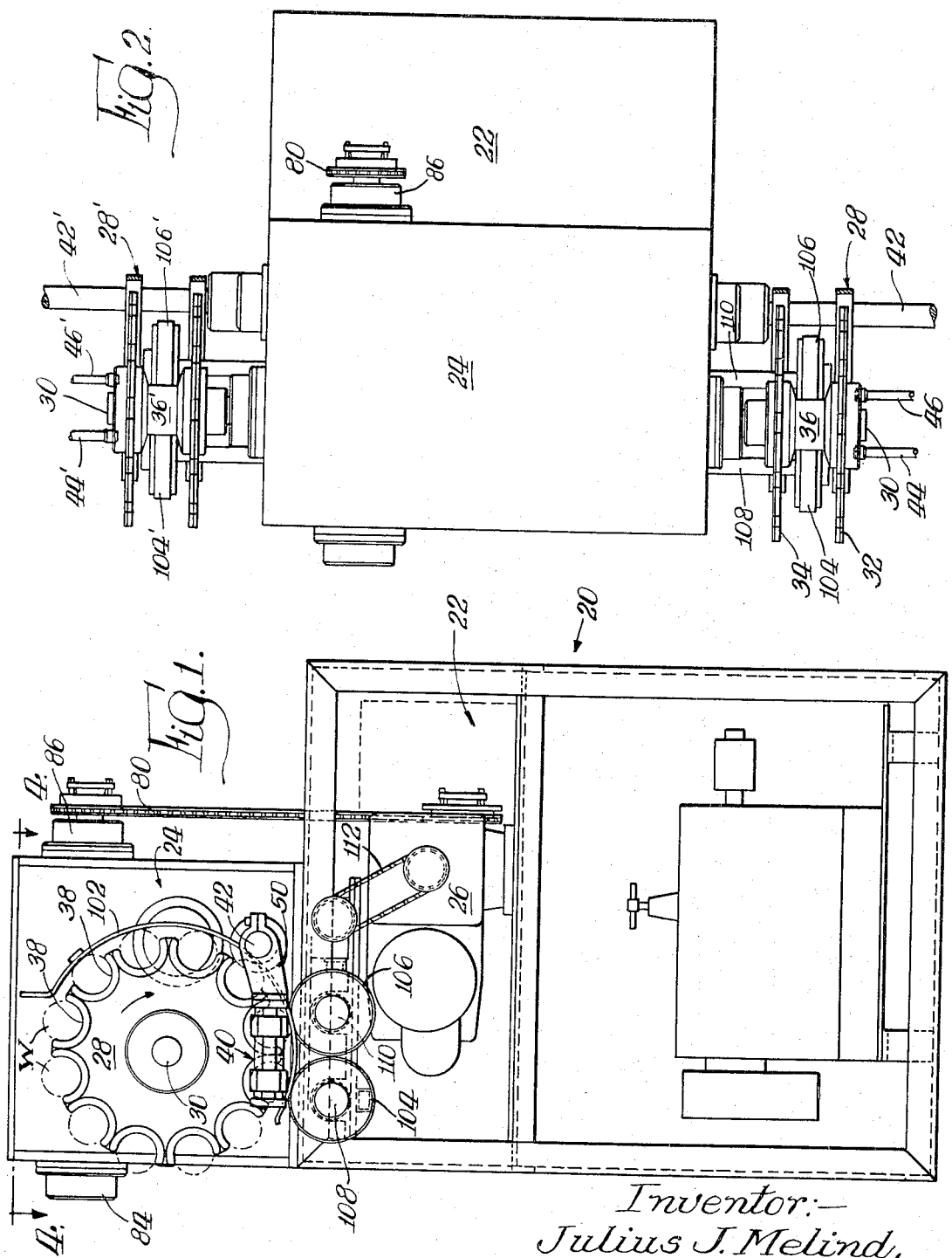

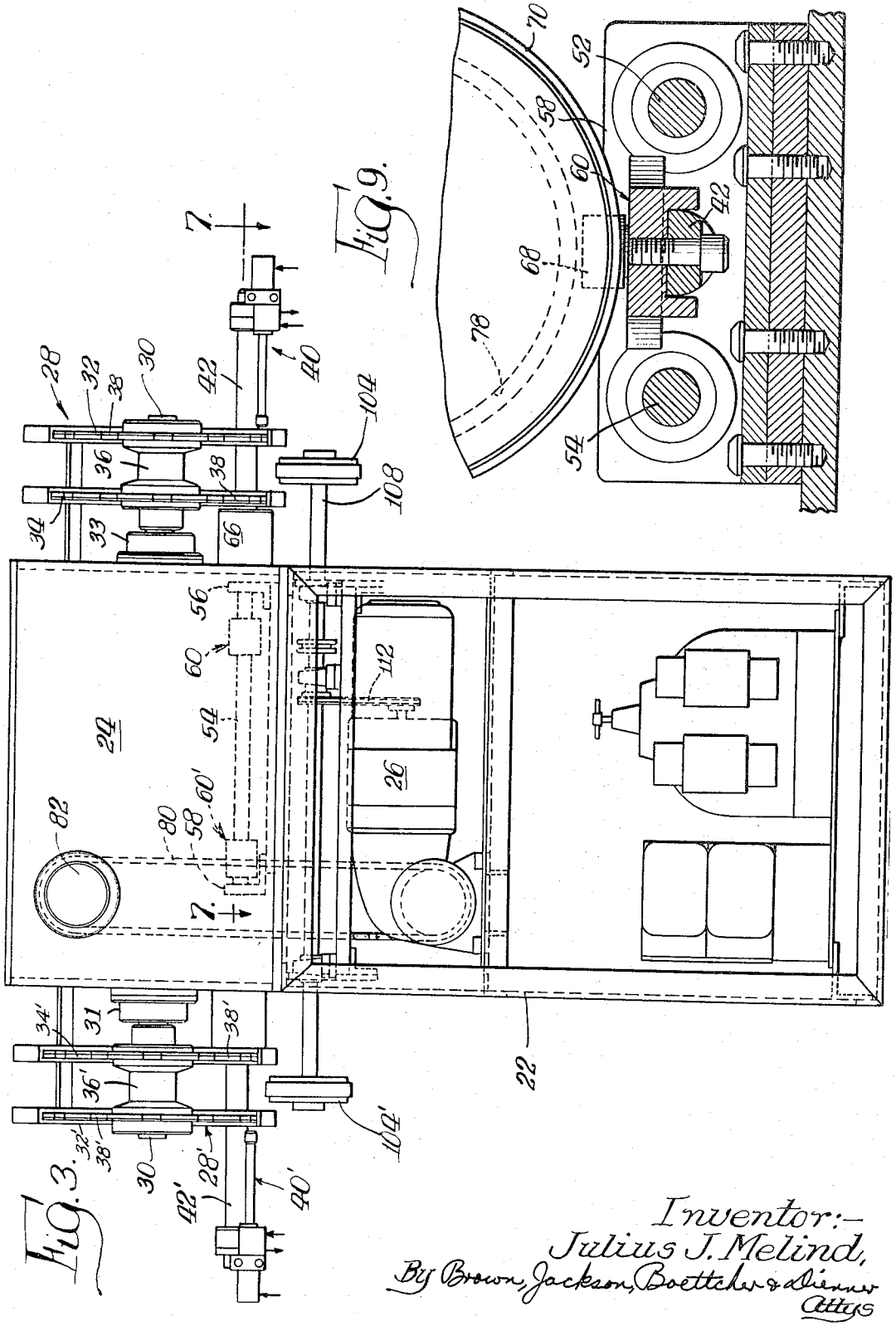

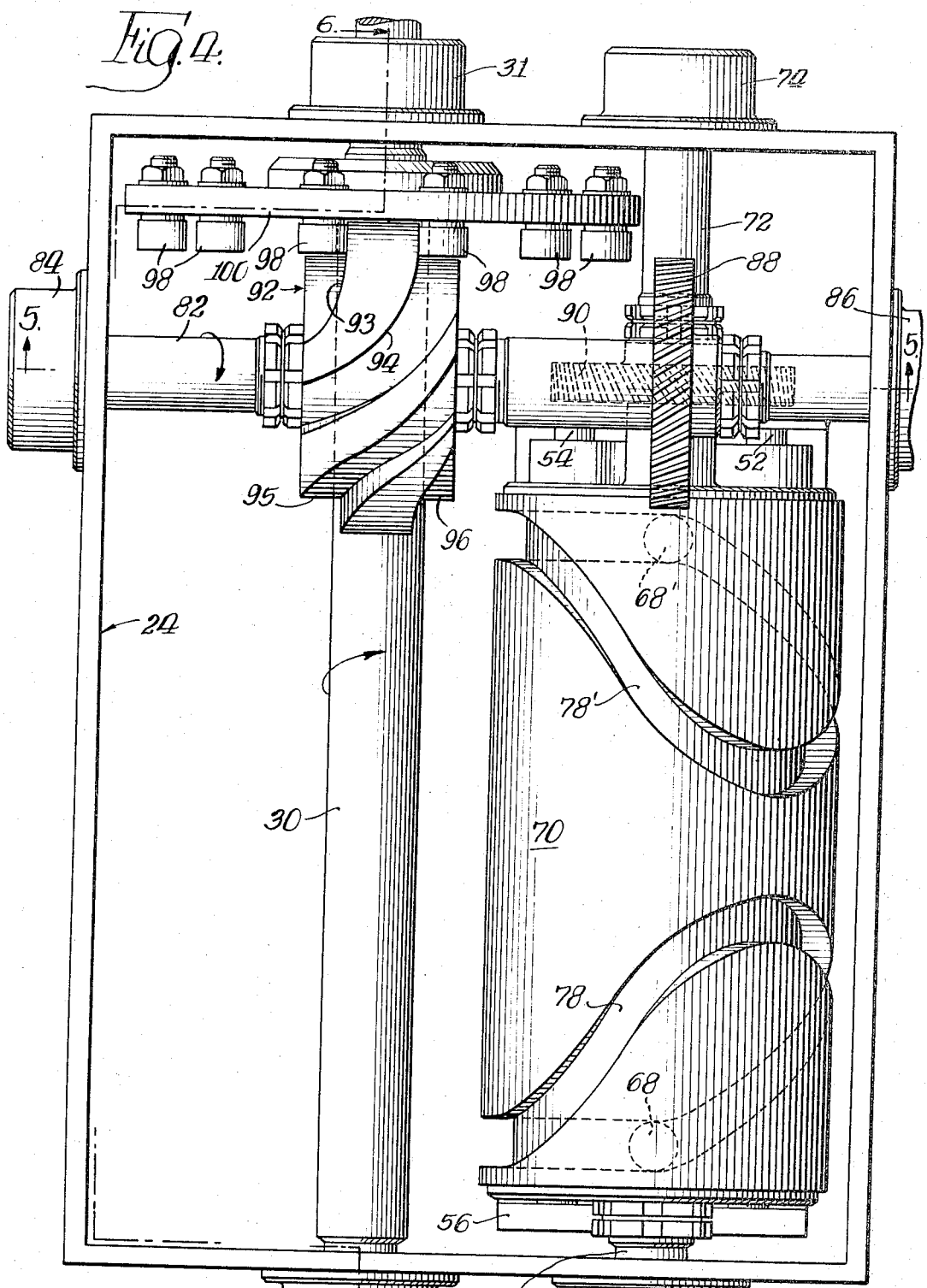

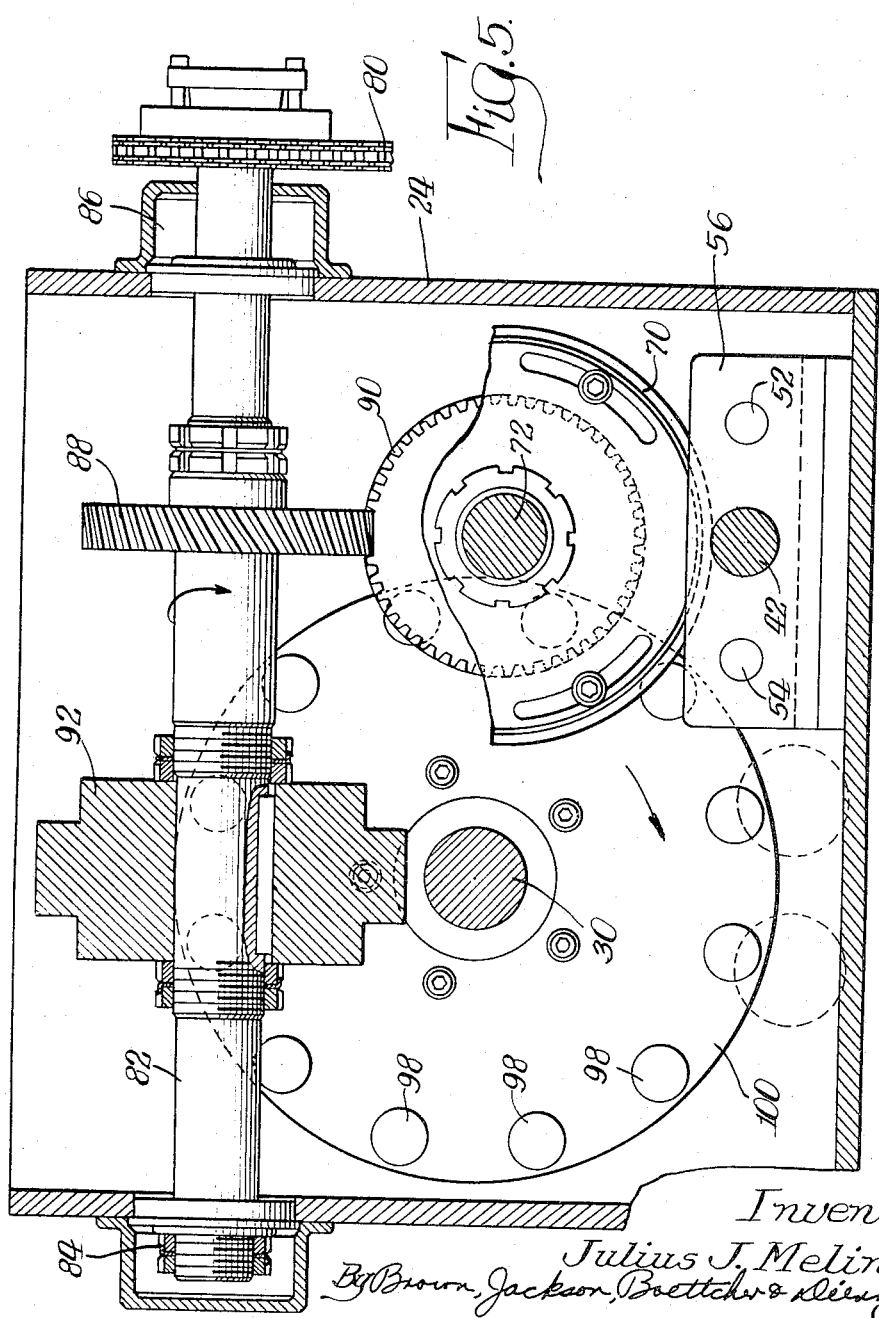

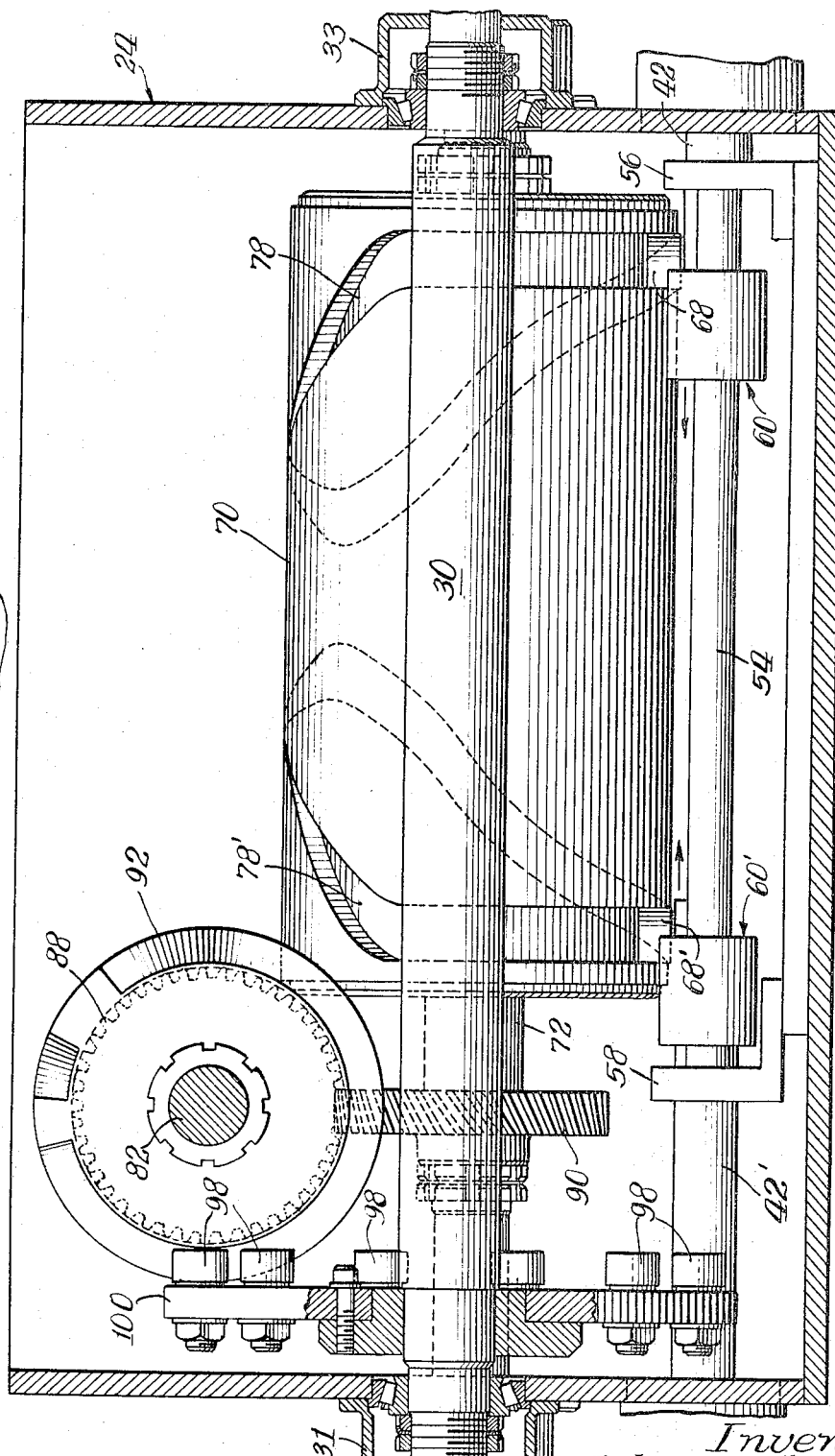

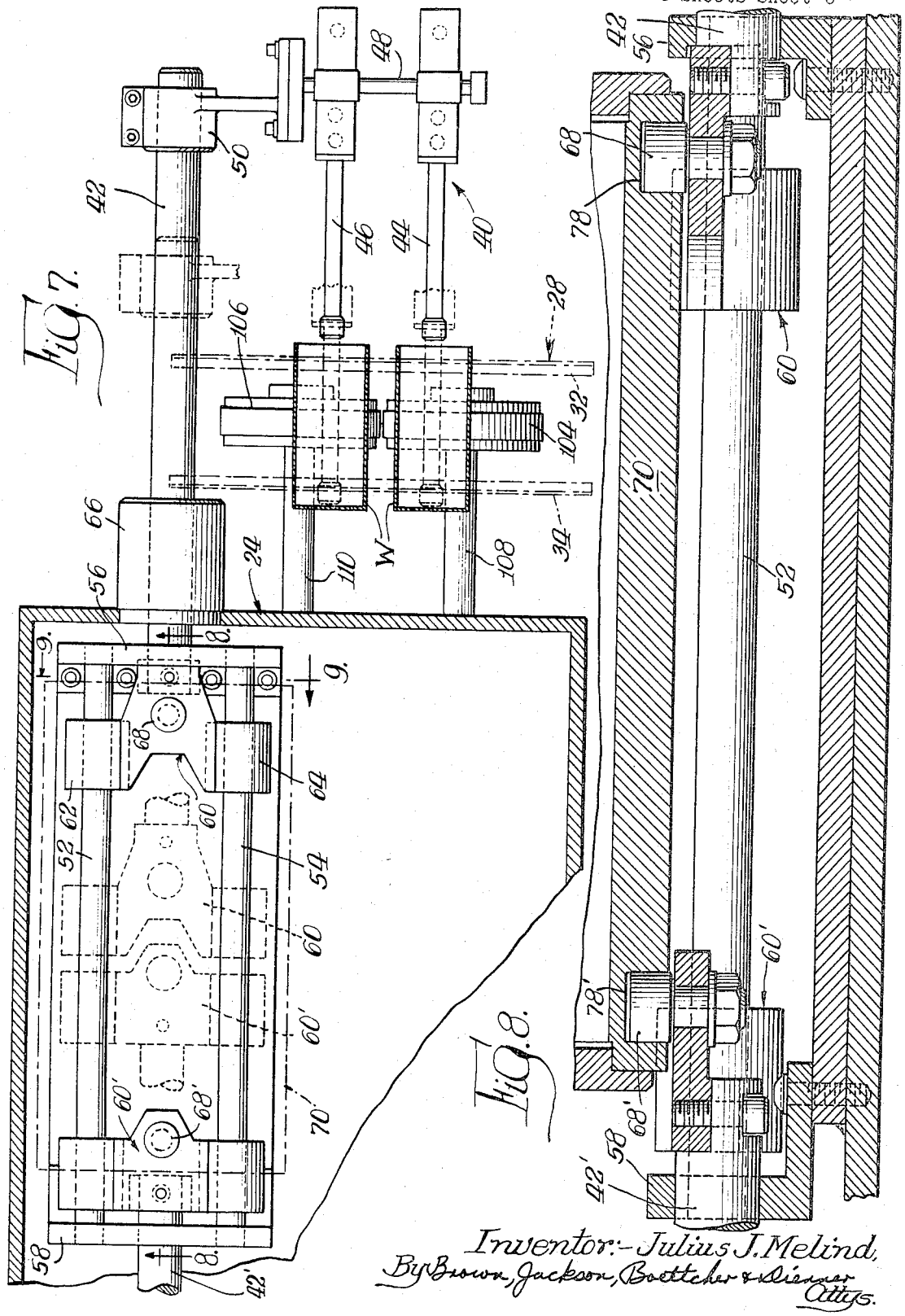

3,357,396
TURRET TYPE INDEXING MACHINE
Julius J. Melind, Park Ridge, Ill., assignor to H. L. Fisher Mfg. Co., Inc., Chicago, Ill., a corporation of Illinois
Filed Feb. 12, 1965, Ser. No. 432,296
3 Claims. (Cl. 118—313)

ABSTRACT OF THE DISCLOSURE

Apparatus for performing an operation on workpieces, such as spraying the insides of the cans with a protective coating material embodying turret means having a plurality of seats for the cans, indexing means for intermittently rotating the turret means to successively position cans to a position to be sprayed, operating means for applying the spray, and actuating means for reciprocating the operating means in timed relation with the indexing means.

---

The present invention relates to a turret type indexing machine for handling work pieces or the like and indexing them past a work station where operations may be performed thereon. The invention relates to the indexing turret members which carry the work pieces to be operated upon and to the mechanism at the work station for performing an operation on the work pieces, and the invention is largely concerned with drive mechanism for intermittently rotating the turret members and for reciprocating the work performing members at the work station.

One embodiment of the invention which is described herein comprises a can spraying machine for spraying the insides of cans with a coating material. In such an embodiment the cans are carried by turret members and are indexed thereby so as to be temporarily disposed at a work station where there are located a pair of spray nozzles which move axially into corresponding cans to spray a coating on the insides thereof and are then withdrawn to permit further indexing of the turret member.

It is an object of the present invention to provide an improved turret type indexing machine including work performing members at a work station which machine operates in a more efficient manner than the machines heretofore developed so as to perform operations simultaneously on a plurality of work pieces.

A further object of the invention is to provide a machine as last above mentioned having improved drive means for intermittently rotating the turret members and for reciprocating the operating means at the work station.

In furtherance of the foregoing objects there are provided a pair of turret members which are connected to a common turret shaft for conjoint rotation, and each turret has a plurality of seats spaced around its periphery for carrying work pieces to be operated on. In the embodiment to be described, such work pieces comprise cans which are to have a coating sprayed on the inside thereof. In combination therewith there are provided two pairs of spray nozzles, one pair of nozzles being positioned adjacent a work station associated with one of the turrets, and the other pair of nozzles being positioned at a work station adjacent the other turret. The rotatable turrets are spaced apart on a common shaft and the two pairs of nozzles are in oppositely disposed relation for simultaneous reciprocating movement first toward one another and then away from one another during a spraying operation. Thus, the turrets are simultaneously indexed so that each turret positions two cans at a work station associated with the turret, and then the two pairs of nozzles are moved toward one another and into corresponding cans so that the two nozzles of one pair are moved into operative relation with two cans at one of the work stations, while the two oppositely disposed nozzles of the other pair are moved into operative relation with two cans at the other work station, after which the spraying operation takes place and the two pairs of nozzles are moved away from one another and returned to their original positions. With such an arrangement it will be understood that four cans are sprayed simultaneously. In addition, there is provided a main drive shaft having first drive means thereon for indexing the two turret members and second drive means thereon for operating cam mechanism which reciprocates the two pairs of nozzles during the spraying operation.

The foregoing and other objects and advantages of the invention will be apparent from the following description thereof.

Now in order to acquaint those skilled in the art with the manner of utilizing and practicing my invention, I shall describe, in conjunction with the accompanying drawings, certain preferred embodiments of my invention.

In the drawings:

FIGURE 1 is a front elevational view of a can spraying machine embodying the present invention, there being shown one of the two turret members which rotate on a common axis to transfer cans in pairs to respective work stations;

FIGURE 2 is a top plan view of the apparatus of FIGURE 1 showing both of the turret members and showing fragmentary portions of two pairs of spray nozzles, one pair being associated with each turret member;

FIGURE 3 is a side elevational view of the apparatus of FIGURE 1;

FIGURE 4 is an enlarged horizontal section, partly broken away, taken substantially along the line 4—4 of FIGURE 1;

FIGURE 5 is a vertical sectional view taken substantially along the line 5—5 of FIGURE 4, a portion of a drum cam member for actuating the spray nozzles being shown in elevation;

FIGURE 6 is a vertical sectional view, partly broken away, taken substantially along the line 6—6 of FIGURE 4;

FIGURE 7 is an enlarged fragmentary horizontal sectional view taken substantially along the line 7—7 of FIGURE 3;

FIGURE 8 is an enlarged fragmentary vertical sectional view taken substantially along the line 8—8 of FIGURE 7; and FIGURE 9 is an enlarged fragmentary vertical sectional view taken substantially along the line 9—9 of FIGURE 7.

It should be understood that while the preferred embodiment of the present invention is illustrated and described herein as a machine for spraying the insides of cans, the invention is not limited to the spraying of cans and may be utilized in various other apparatus where it is desired to index an object or work piece to bring the same to a work station where an operation is performed on the work piece. In accordance with the present invention, two turret members are operated together, each turret simultaneously positions two work pieces at its corresponding work station, and each work station has a pair of operating members associated therewith which are actuated together so that four operations are performed simultaneously.

Referring now to the drawings, FIGURE 1 shows a can spraying machine 20 comprising a lower housing 22, an upper housing 24, a drive motor 26 disposed within the lower housing, and a turret 28 which is mounted at one end of a turret shaft 30 and is disposed externally of the upper housing 24 at the front thereof. Referring to FIGURES 2 and 3, it will be seen that the turret shaft 30 extends through the entire upper housing 24 so as to project substantially outward from the housing at both the front and rear thereof, the shaft being supported in bearings 31 and 33. Thus, the turret 28 is mounted on the front end of the shaft 30 and a second turret 28' is mounted at the rear end of the shaft. The two turrets 28 and 28' are thereby interconnected by the turret shaft 30 for conjoint rotation.

The turret 28 comprises a pair of parallel spaced apart turret plates 32 and 34 which are affixed to a common hub member 36 and thereby mounted as a unit on the end of the turret shaft 30. As shown in FIGURE 1, each of the turret plates 32 and 34 has a plurality of generally semi-circular seats 38 formed therein for receiving and carrying cans which are to be sprayed. In the embodiment shown each turret plate has twelve seats 38 spaced equally around the periphery of the plate, the seats thus in effect being spaced apart an angle of 30 degrees. The turret 28' is substantially identical to the turret 28 and comprises turret plates 32' and 34' each having twelve semi-circular seats 38' formed therein. As will be explained more fully later herein, the turrets 28 and 28' are intermittently rotated through an angle of 60 degrees, so that each turret will convey two cans at a time to a corresponding work station for a spraying operation.

FIGURE 3 shows a pair of oppositely disposed spray nozzle assemblies 40 and 40' which operate to spray the insides of cans disposed at the undersides of the turrets 28 and 28' respectively. The spray assembly 40 is carried on a shaft 42, while the spray assembly 40' is carried on a shaft 42', and during a spraying operation these two shafts are first moved towards one another to dispose the nozzles inside of respective cans to be sprayed, at which approximate time spraying is initiated, and are then moved away from one another to be returned to their original positions substantially as shown in FIGURE 3. As shown in FIGURE 7 the spray assembly 40 comprises two spray nozzles 44 and 46 mounted on a common support rod 48 which in turn is carried on a hub 50 secured on the outer end of the shaft 42. There are also shown a pair of cans or work pieces W as disposed at a work station in position to be sprayed, and it will be understood that when the shaft 42 is moved to the left as viewed in FIGURE 7, the nozzles 44 and 46 will be moved to the positions shown in dash lines wherein they will be disposed inside the two cans W. While the nozzles are disposed within the cans, spray may be ejected from the nozzles to coat the insides of the cans, and the nozzles are withdrawn and returned to their original positions by moving the shaft 42 to the right to its original position. The nozzle assembly 40' is substantially identical to the assembly 40 and thus will not be described in detail. However, it is important to understand that the two nozzle assemblies 40 and 40' are first moved simultaneously toward one another during a spraying operation and are then moved simultaneously away from one another to be returned to their original positions, whereby four cans W are sprayed simultaneously. The mechanism for producing such opposed reciprocation of the spray assemblies 40 and 40' will now be described.

FIGURE 7 shows a pair of guide rods 52 and 54 which extend horizontally in parallel relation to one another and have their ends fixedly mounted in support plates 56 and 58. A slide member 60 includes a pair of cylindrical bearings 62 and 64 which encompass the guide rods 52 and 54 and are slidable thereon, and the slide 60 is secured to the end of the shaft 42. The shaft 42 passes through a bearing 66 which is fixedly mounted to the front of the upper housing 24, whereby the shaft 42 is supported by the bearing 66 and is slidable therein. A cam follower roller 68 is mounted on the top of the slide 60, and cam means to be described hereinafter acts upon the follower 68 to control the reciprocating movement of the shaft 42 and nozzle assembly 40. It should be noted that there is also provided a second slide 60' which is mounted on the end of the shaft 42' and is slidable on the guide rods 52 and 54 in the manner described above relative to the slide 60. The slide 60' also carries at the upper end thereof a cam follower roller 68' which is acted upon to control the reciprocating movement of the spray nozzle assembly 40'.

Referring now to FIGURES 4 and 6, a drum cam 70 is fixedly mounted on a shaft 72 which is horizontally disposed within the upper housing 24 in parallel relation to the guide rods 52 and 54. The opposite ends of the drum shaft 72 are rotatably supported in bearings 74 and 76, and during operation of the machine the shaft 72 and drum cam 70 are continuously rotated by drive mechanism to be described later herein. The drum cam 70 has two separate cam tracks 78 and 78' formed therein, and the drum cam is disposed immediately above the slides 60 and 60' with the follower roller 68 disposed within the cam track 78 and the follower roller 68' disposed within the cam track 78'. Each of the cam tracks 78 and 78' is continuous and extends around the periphery of the drum 70, and the two cam tracks are of opposite configuration to one another so that when the slide 60 is moved to the left a given distance as viewed in FIGURE 6, the slide 60' will be moved to the right an equal distance, and vice versa. FIGURE 6 shows the two slides 60 and 60' in their outermost positions wherein the two nozzle assemblies 40 and 40' will be in their outermost positions as shown in FIGURE 3. As the drum cam 70 rotates, the cam followers 68 and 68' follow in the tracks 78 and 78' causing the slides 60 and 60' to move toward one another, thus pulling the nozzle support shafts 42 and 42' and the nozzle assemblies 40 and 40' toward one another. The slides 60 and 60' are shown in their extreme inward positions in dash lines in FIGURE 7, at which time the nozzles 44 and 46 of the nozzle assemly 40 will be disposed inside of two cans disposed at a work station associated with the turret 28 as also shown in dash lines, and the nozzles of the opposite nozzle assembly 40' will be disposed inside of a pair of cans positioned at a work station associated with the turret 28'. As the drum cam 70 continues to rotate, the followers 68 and 68' and the nozzle assemblies 40 and 40' are next moved outwardly away from one another to be returned to their original positions. During one complete rotation of the drum cam 70, the nozzle assemblies 40 and 40' are thus moved from their outermost positions to their innermost positions and then back again to their outermost positions, and during such reciprocating travel the nozzles are actuated to spray a coating on the insides of the respective cans.

The drive mechanism for indexing the turrets 28 and 28' and for rotating the drum cam 70 will now be described. The motor 26 drives an endless chain 80 (see FIGURES 1 and 3) which in turn rotates a main drive shaft 82. FIGURES 4 and 5 show the manner in which the main drive shaft 82 is mounted within the upper housing 24, one end of the shaft being supported in a bearing 84 and the other end being supported in a bearing 86. It will be understood that during operation of the can spraying machine herein described the main drive shaft 82 will be rotated continuously. The main drive shaft 82 has a helical gear 88 fixedly mounted thereon for conjoint rotation therewith, and the gear 88 meshes with a second helical gear 90 which is fixedly mounted on the drum cam shaft 72 for rotation therewith. There is a one-to-one gear ratio between the helical gears 88 and 90, and thus the drum cam 70 is driven one revolution for each revolution of the main drive shaft 82. Accordingly, during each revolution of the main drive shaft 82, the spray nozzle assemblies 40 and 40' are moved inwardly toward one another and then outwardly again to their original positions to complete one spraying operation.

In order to index the turret members 28 and 28', a cam 92 is fixedly mounted on the main drive shaft 82 in spaced relation to the helical gear 88 for conjoint rotation with the latter and the main drive shaft. The cam 92 has a plurality of cam tracks formed therein as shown in FIGURE 4 at 93, 94, 95 and 96, and such cam tracks cooperate with a plurality of follower rollers 98 which are mounted on a cam follower disc 100. The cam follower disc 100 is fixedly mounted on the turret shaft 30 in such a manner that rotation of the disc 100 will rotate the shaft 30, which in turn will simultaneously rotate the two turrets 28 and 28' which are carried at opposite ends of the turret shaft. There are twelve follower rollers 98 mounted on the disc 100, and the rollers are arranged in a circle and equally spaced apart by an angle of 30 degrees in accordance with the spacing of the turret seats 38. As the cam 92 rotates with the main drive shaft 82, two of the follower rollers 98 will be acted upon by the cam tracks formed in the cam so as to rotate the disc 100, and as one of the followers 98 is moved out of engagement with the cam 92 a further follower roller 98 is picked up in one of the cam tracks. Accordingly, the cam 92 acts upon two of the follower rollers 98 at a time, and the several rollers are moved consecutively into a position to be engaged by the cam whereby the cam member 92 maintains continuous control over the position of the disc 100. Suitable dwell areas are formed on the cam tracks 93, 94, 95 and 96 so that the rotation of the disc 100 and the turrets 28 and 28' will be intermittent, since the turrets must be stationary while the nozzle assemblies 40 and 40' are engaged in a spraying operation. Thus, the cam tracks in the cam 92 are designed to rotate or index the turrets 28 and 28' intermittently in steps of 60 degrees. One full revolution of the main drive shaft 82 and cam 92 will produce a rotation of the turrets 28 and 28' of 60 degrees, and will also include a dwell period for the spraying operation.

In operation, the main drive shaft 82 is rotated continuously, and through the gears 88 and 90 the drum cam 70 is continuously rotated. The continuously rotating cam 92 on the drive shaft 82 operates on the followers 98 for intermittently rotating the follower disc 100 and the two turret members 28 and 28'. The cam 92 during each revolution thereof will rotate the two turrets 28 and 28' simultaneously through an angle of 60 degrees, and will then provide a dwell period. The cam tracks 78 and 78' of the drum cam 70 also provide for a dwell period so that the nozzle assemblies 40 and 40' will remain in their outer positions while the turrets are indexing, it further being understood that the turrets are stationary while the nozzle assemblies are being reciprocated during a spraying operation.

Referring to FIGURE 1, cans W to be sprayed are supplied from one conveyor (not shown) disposed above the turret 28 and another conveyor (not shown) disposed above the turret 28'. Thus, while the turrets 28 and 28' are stationary, two cans W are supplied from above to the uppermost two seats 38 in the turret 28, and two cans W are supplied from above to the uppermost two seats 38' in the turret 28'. The turrets 28 and 28' are then rotated 60 degrees. It will be seen that an arcuate retainer rail 102 is provided in proximity to the turret 28 around one side thereof to maintain the cans positioned in the seats 38, and a similar retainer rail is associated with the turret 28'. The turrets continue to be rotated intermittently in 60 degree increments, and when a pair of cans are located at the bottom of the turret, which may be referred to as a work station, the cans are sprayed. Thus, when the two turrets 28 and 28' stop with each having a pair of cans disposed in two seats 38 at the underside of the turret, the drum cam 70 acts upon the followers 68 and 68' to move the slides 60 and 60' to the positions shown in dash lines in FIGURE 7, whereby the nozzle assemblies 40 and 40' are moved toward one another so as to dispose the nozzles inside of the cans, i.e., the two nozzles 44 and 46 are disposed inside the two cans positioned at the bottom of the turret 28 at the work station thereof as shown in dash lines in FIGURE 7, and the two nozzles of the opposite nozzle assembly 40' are similarly disposed inside two cans positioned at the bottom of the turret 28'.

Conventional means not described herein may be utilized to initiate the release of the spray from the nozzles and also to sense the presence of cans in position to be sprayed to assure that spray is not ejected from a nozzle unless a can is present to receive the same. The nozzle assemblies 40 and 40' are reciprocated by the drum cam 70 and thus after they are moved into the cans W to effect the simultaneous spraying of four cans, two in each of the turrets 28 and 28', the nozzle assemblies are returned to their original positions. It will be noted that immediately beneath the turret 28 at the work station thereof there are provided a pair of rotatable disc members 104 and 106 which are mounted on shafts 108 and 110 for rotation therewith and are driven from the motor 26 by a chain drive 112. Similar rotatable discs 104' and 106' are carried on the opposite ends of the shafts 108 and 110 and are disposed beneath the turret member 28' at the work station thereof. The rotatable discs engage against the cans W which are disposed at the work stations in position to be sprayed and rotate such cans so as to provide for more even distribution of the spray on the interior of the cans.

Once the spraying operation is completed and the nozzle assemblies 40 and 40' have been returned to their outer positions, the turrets 28 and 28' are again indexed 60 degrees so that each of the turrets will position two more cans in position to be sprayed, at which time the two cans previously sprayed at each work station are discharged from each turret and two new cans to be sprayed are supplied to each of the turrets from conveyors thereabove. The main drive shaft 82 together with the helical gear 88 and cam 92 carried thereon rotate continuously, and the gear 88 continuously drives the drum cam shaft 72 so as to rotate the drum cam 70 one revolution for each revolution of the main shaft. Suitable dwell portions are provided on the cam tracks 93, 94, 95 and 96 formed on the cam 92 and suitable dwell portions are also provided on the cam tracks 78 and 78' formed on the drum cam 70 so that the nozzle assemblies 40 and 40' will remain in their outer positions of FIGURE 3 while the turrets 28 and 28' are indexing, and the turrets will remain stationary while the nozzle assemblies are reciprocating during a spraying operation.

It should be understood that my invention is not limited to can spraying machines but is applicable to various other machines for indexing work pieces to move the same to a work station where an operation is performed thereon, particularly where it is desired to operate on at least four work pieces simultaneously. Thus, while I have illustrated my invention in a preferred form, I do not intend to be limited to that form, except insofar as the appended claims are so limited, since modifications coming within the scope of my invention will be readily suggested to others with my disclosure before them.

I claim:

1. In apparatus for indexing a plurality of workpieces or the like to be operated on and for performing operations simultaneously on a plurality of workpieces, the improvement comprising, in combination, a pair of turret members interconnected for conjoint rotation about a common axis, each of said turret members having a plurality of seats formed around the periphery thereof for holding workpieces to be operated on, indexing means for intermittently rotating said turret members to dispose at least two of the workpieces in each of said turret members in position to be operated on, a first pair of operating means associated with a first one of said turret members for reciprocating movement first toward a pair of workpieces carried by said first turret member and then away therefrom during which movement an operation is performed on such workpieces, a second pair of operating means associated with a second one of said turret members for reciprocating movement first toward a pair of workpieces carried by said second turret member and then away therefrom during which movement an operation is performed on such workpieces, actuating means mounted on a rotatable shaft for simultaneously reciprocating said first and second pairs of operating means first toward the corresponding workpieces and then away therefrom to operate upon at least four workpieces simultaneously, said actuating means comprising a first cam having two separate cam tracks therein, one cam track controlling the reciprocating movement of said first pair of operating means and the other cam track controlling the reciprocating movement of said second pair of operating means, a main drive shaft having a second cam fixedly carried thereon for driving said indexing means to rotate said first and second turret members one predetermined increment of rotation during each revolution of said main drive shaft, and a first gear fixedly carried on said rotatable shaft and a second gear fixedly carried on said main drive shaft, said gears having a one-to-one drive ratio and being in continuous engagement with one another whereby said main drive shaft will drive said rotatable shaft and said actuating means through one revolution for each revolution of said main drive shaft thereby driving said indexing means and said actuating means in synchronism so as to reciprocate said two pairs of operating means while said turret members are temporarily stationary.

2. In apparatus for indexing a plurality of workpieces or the like to be operated on and for performing operations simultaneously on a plurality of workpieces, the improvement comprising, in combination, a pair of turret members mounted for conjoint rotation on a common turret shaft, each of said turret members having a plurality of seats formed around the periphery thereof for holding workpieces to be operated on, indexing means for intermittently rotating said turret members to dispose the workpieces in said turret members in positions to be operated on, first operating means associated with a first one of said turret members for reciprocating movement first toward and then away therefrom during which movement an operation is performed, second operating means associated with a second one of said turret members for reciprocating movement first toward and then away therefrom during which movement an operation is performed, actuating means mounted on a rotatable shaft for simultaneously reciprocating said first and second operating means first toward and then away from their respective turrets, said actuating means comprising a first substantially cylindrical drum having two separate cam tracks therein, said first and second operating means having cam followers engageable one each in one each of said cam tracks, one cam track and one of said cam followers controlling the reciprocating movement of said first operating means and the other cam track and the other cam follower controlling the reciprocating movement of said second operating means, a main drive shaft having a second cam fixedly carried thereon for driving said indexing means to rotate said first and second turret members one predetermined increment of rotation during each revolution of said main drive shaft, and a first gear fixedly carried on said rotatable shaft and a second gear fixedly carried on said main drive shaft, siad gears having a one-to-one drive ratio and being in continuous engagement with one another whereby said main drive shaft will drive said rotatable shaft and said actuating means through one revolution for each revolution of said main drive shaft thereby driving said indexing means and said actuating means in synchronism so as to reciprocate said first and second operating means while said turret members are temporarily stationary.

3. The apparatus of claim 2 in which said indexing means comprises a cam follower disc fixed to said turret shaft, a plurality of second cam followers mounted for rotation on said cam follower disc, and in which said second cam is formed with a pair of second cam tracks for engagement with a pair of adjacent second cam followers for effecting rotation of said cam follower disc and said turret members.

References Cited

UNITED STATES PATENTS

| | | |
|---|---|---|
| 611,811 | 10/1898 | Hormby. |
| 705,430 | 7/1902 | Ortmann et al. _____ 15—64 |
| 966,816 | 8/1910 | Fischer _____ 77—21 X |
| 1,734,290 | 11/1929 | Eberhart _____ 118—319 X |
| 2,103,270 | 12/1937 | Murch _____ 118—319 X |
| 2,943,001 | 6/1960 | Socke _____ 118—319 X |
| 3,020,682 | 2/1962 | Spetzler et al. |

FOREIGN PATENTS

| | | |
|---|---|---|
| 236,841 | 7/1925 | Great Britain. |
| 65,509 | 7/1928 | Sweden. |

DANIEL BLUM, *Primary Examiner.*